(12) United States Patent
McIntosh et al.

(10) Patent No.: US 9,349,413 B2
(45) Date of Patent: May 24, 2016

(54) USER INTERFACE FOR VIDEO PREVIEW CREATION

(71) Applicant: REDUX, INC., Berkeley, CA (US)

(72) Inventors: David McIntosh, Del Mar, CA (US); Chris Pennello, Berkeley, CA (US)

(73) Assignee: ALC HOLDINGS, INC., San Francisco, CA (US)

( * ) Notice: Subject to any disclaimer, the term of this patent is extended or adjusted under 35 U.S.C. 154(b) by 2 days.

(21) Appl. No.: 14/173,715

(22) Filed: Feb. 5, 2014

(65) Prior Publication Data

US 2014/0219629 A1 Aug. 7, 2014

Related U.S. Application Data

(60) Provisional application No. 61/761,096, filed on Feb. 5, 2013, provisional application No. 61/822,105, filed on May 10, 2013, provisional application No. 61/847,996, filed on Jul. 18, 2013, provisional application No. 61/905,772, filed on Nov. 18, 2013.

(51) Int. Cl.
| | |
|---|---|
| H04N 5/93 | (2006.01) |
| G11B 27/00 | (2006.01) |
| G11B 27/031 | (2006.01) |
| G11B 20/00 | (2006.01) |
| G11B 27/034 | (2006.01) |
| G11B 27/036 | (2006.01) |
| H04N 5/04 | (2006.01) |
| G06F 3/0484 | (2013.01) |
| H04N 21/482 | (2011.01) |
| H04N 21/8549 | (2011.01) |
| G11B 27/34 | (2006.01) |
| H04N 21/472 | (2011.01) |
| H04N 21/845 | (2011.01) |

(Continued)

(52) U.S. Cl.
CPC ............ *G11B 27/031* (2013.01); *G06F 3/0484* (2013.01); *G06F 3/04855* (2013.01); *G06K 9/00751* (2013.01); *G11B 20/00007* (2013.01); *G11B 27/034* (2013.01); *G11B 27/036* (2013.01); *G11B 27/105* (2013.01); *G11B 27/34* (2013.01); *H04N 5/04* (2013.01); *H04N 21/47217* (2013.01); *H04N 21/482* (2013.01); *H04N 21/8455* (2013.01); *H04N 21/8549* (2013.01)

(58) Field of Classification Search
USPC .................................................. 386/278–284
See application file for complete search history.

(56) References Cited

U.S. PATENT DOCUMENTS

| | | |
|---|---|---|
| 6,526,577 B1 | 2/2003 | Knudson |
| 7,844,354 B2 | 11/2010 | Keohane |

(Continued)

OTHER PUBLICATIONS

Notice of Allowance dated Sep. 11, 2015, in U.S. Appl. No. 14/173,740, 15 pages.

(Continued)

*Primary Examiner* — Nigar Chowdhury
(74) *Attorney, Agent, or Firm* — Kilpatrick Townsend & Stockton LLP

(57) ABSTRACT

Providing a method for creating and displaying portions of videos called video previews. The video previews may be associated with a predefined duration of a full video, such that the video preview is generated from a portion of the full video. The video previews are configured to play a series of images associated with images from the portion of the full video when the video preview is activated.

41 Claims, 10 Drawing Sheets

(51) Int. Cl.
  *G11B 27/10* (2006.01)
  *G06F 3/0485* (2013.01)
  *G06K 9/00* (2006.01)

(56) References Cited

U.S. PATENT DOCUMENTS

| | | | |
|---|---|---|---|
| 8,244,103 | B1 | 8/2012 | Shore |
| 2002/0112244 | A1 | 8/2002 | Liou et al. |
| 2005/0257152 | A1 | 11/2005 | Shimizu |
| 2006/0272000 | A1 | 11/2006 | Kwak et al. |
| 2007/0136750 | A1 | 6/2007 | Abanami |
| 2008/0036917 | A1 | 2/2008 | Pascarella |
| 2008/0136790 | A1 | 6/2008 | Hio |
| 2008/0301579 | A1 | 12/2008 | Jonasson et al. |
| 2009/0094159 | A1 | 4/2009 | Cunningham et al. |
| 2009/0199251 | A1 | 8/2009 | Badoiu et al. |
| 2010/0070523 | A1 | 3/2010 | Delgo |
| 2010/0260468 | A1* | 10/2010 | Khatib et al. ............... 386/52 |
| 2012/0017150 | A1 | 1/2012 | Pollack |
| 2012/0079529 | A1 | 3/2012 | Harris et al. |
| 2012/0099641 | A1 | 4/2012 | Bekiares et al. |
| 2012/0141095 | A1 | 6/2012 | Schwesinger |
| 2012/0201517 | A1* | 8/2012 | Sakuragi et al. .............. 386/278 |
| 2012/0278725 | A1 | 11/2012 | Gordon |
| 2012/0278764 | A1 | 11/2012 | Arriola |
| 2012/0290933 | A1 | 11/2012 | Rajaraman |
| 2012/0323897 | A1 | 12/2012 | Daher |
| 2012/0328265 | A1* | 12/2012 | Sakuragi et al. .............. 386/278 |
| 2013/0007198 | A1 | 1/2013 | Gupta et al. |
| 2013/0024895 | A1 | 1/2013 | Yong |
| 2013/0031219 | A1 | 1/2013 | Liu |
| 2013/0042271 | A1 | 2/2013 | Yellin |
| 2013/0047084 | A1 | 2/2013 | Sanders |
| 2013/0097550 | A1 | 4/2013 | Grossman |
| 2013/0129317 | A1 | 5/2013 | Moorer |
| 2013/0163963 | A1 | 6/2013 | Crosland |
| 2013/0317951 | A1 | 11/2013 | Kuznetsov |
| 2014/0143725 | A1 | 5/2014 | Lee |
| 2014/0169766 | A1* | 6/2014 | Yu et al. ................. 386/282 |
| 2016/0064034 | A1 | 3/2016 | McIntosh |

OTHER PUBLICATIONS

Non-Final Office Action dated Nov. 4, 2015, in U.S. Appl. No. 14/173,753, 36 pages.
Non-Final Rejection, dated May 28, 2015, for U.S. Appl. No. 14/173,697, filed Feb. 5, 2014, 14 pages.
Restriction Requirement, dated Jun. 19, 2015, for U.S. Appl. No. 14/173,740, filed Feb. 5, 2014, 8 pages.
Non-Final Office Action dated Dec. 17, 2015, for U.S. Appl. No. 14/173,732, 12 pages.
Final Office Action dated Feb. 25, 2016, for U.S. Appl. No. 14/173,697, filed Feb. 5, 2014, 16 pages.
Non-Final Rejection, dated Feb. 11, 2016, for U.S. Appl. No. 14/173,745, filed Feb. 5, 2014, 15 pages.

\* cited by examiner

US 9,349,413 B2

USER INTERFACE FOR VIDEO PREVIEW CREATION

CROSS-REFERENCE TO RELATED APPLICATIONS

This application is a non-provisional application of U.S. patent application No. 61/761,096, filed on Feb. 5, 2013, U.S. patent application No. 61/822,105, filed on May 10, 2013, U.S. patent application No. 61/847,996, filed on Jul. 18, 2013, and U.S. patent application No. 61/905,772, filed on Nov. 18, 2013, which are herein incorporated by reference in their entirety for all purposes.

This application is related to commonly owned and concurrently filed U.S. patent application Ser. No. 14/173,697, entitled "Video Preview Creation with Link", U.S. patent application Ser. No. 14/173,732, entitled "Video Preview Creation based on Environment", U.S. patent application Ser. No. 14/173,740, entitled "Video Preview Creation with Audio", U.S. patent application Ser. No. 14/173,745, entitled "Generation of Layout of Videos", U.S. patent application Ser. No. 14/173,753, entitled "Activating a Video Based on Location in Screen", which are herein incorporated by reference in their entirety for all purposes.

BACKGROUND

Users commonly provide video content to websites (e.g., YouTube®), which can be referred to as "posting a video." The user can spend a significant amount of time to convey the message of the video before the user selects the video (e.g., by clicking the video displayed on a website). For example, the user can associate a title, a static thumbnail image, and/or a textual description with the video. Users often have a difficult time when the video originates on a different website and the user tries to upload their video to a video server. Further, the title may not be descriptive of the contents of the video, the static thumbnail image may not summarize the essence of the video, or the description of the video may be a poor signal for whether the video will be interesting to a viewer.

Video browsing is also limited. Other users (e.g., viewers) can access and view the video content via the websites. For example, the viewers can see a video's title and static thumbnail of the video before deciding whether to play the full video. However, the viewers may find it difficult to select particular videos of interest because the title may not be descriptive of the contents of the video, the static thumbnail image may not summarize the essence of the video, or the textual description with the video may be a poor signal for whether the video will be interesting to the viewer. Thus, the viewers may spend significant amounts of time searching and watching videos that are not enjoyable to the viewer.

SUMMARY

Embodiments of the present invention can create and display portions of videos as video previews. The video previews may be associated with a full video, such that the video preview is generated from a portion of the full video using a timestamp corresponding to when a request to generate a video preview (e.g., associated with the full video, included in a request signal, etc.) was activated. The duration of the video preview can be based on a predefined length of time. In some embodiments, the video preview can be configured to play a series of images from the full video when the video preview is activated). Other embodiments are directed to systems and computer readable media associated with methods described herein.

A better understanding of the nature and advantages of the present invention may be gained with reference to the following detailed description and the accompanying drawings.

DEFINITIONS

A "video preview" is a visual representation of a portion of a video (also referred to as a "full video" to contrast a "video preview" of the video). The full video may correspond to the entirety of a video file or a portion of the video file, e.g., when only a portion of the video file has been streamed to a user device. The preview is shorter than the full video, but the full video can be shorter than the complete video file. The preview can convey the essence of the full video. The video preview is shorter (e.g., fewer images, less time) than a full (e.g., more images, longer time, substantially complete) video. In various embodiments, a preview can be a continuous portion of the full video or include successive frames that are not continuous in the full video (e.g., two successive frames of the preview may actually be one or more seconds apart in the full video).

DETAILED DESCRIPTION

Embodiments of the present invention can enhance video viewing by providing short, playable video previews through a graphical user interface (GUI). Viewers can use the GUI of video previews to better decide whether to watch a full video, or channel of videos.

In one embodiment, the user may create a video preview that may later be accessed by a viewer. For example, the user may select the best 1-10 seconds of a video to convey the essence of the full video. The video preview can be shorter (e.g., fewer images, less time) than a full (e.g., more images, longer time, substantially complete) video. The system associated with the GUI may generate a smaller file to associate with the video portion (e.g., animated GIF, MP4, collection of frames, RIFF). In some embodiments, the system can generate a video preview using a one-touch activation when the user sees a scene that they like (e.g., user taps an activation tool after they watch the scene and system generates a video preview of a predetermined length of time, ending at the point when the activation tool was tapped).

The system may provide the GUI on a variety of systems. For example, the GUI can be provided via an internet browser or client applications (e.g., software configured to be executed on a device), and configured to run on a variety of devices (e.g., mobile, tablet, set-top, television, game console). In other examples, a Resource Interchange File Format (RIFF) format can be used as a container format for storing data (e.g., the video preview, the full video, frames/images) in chunks.

I. Providing Video Previews

Figure 1:
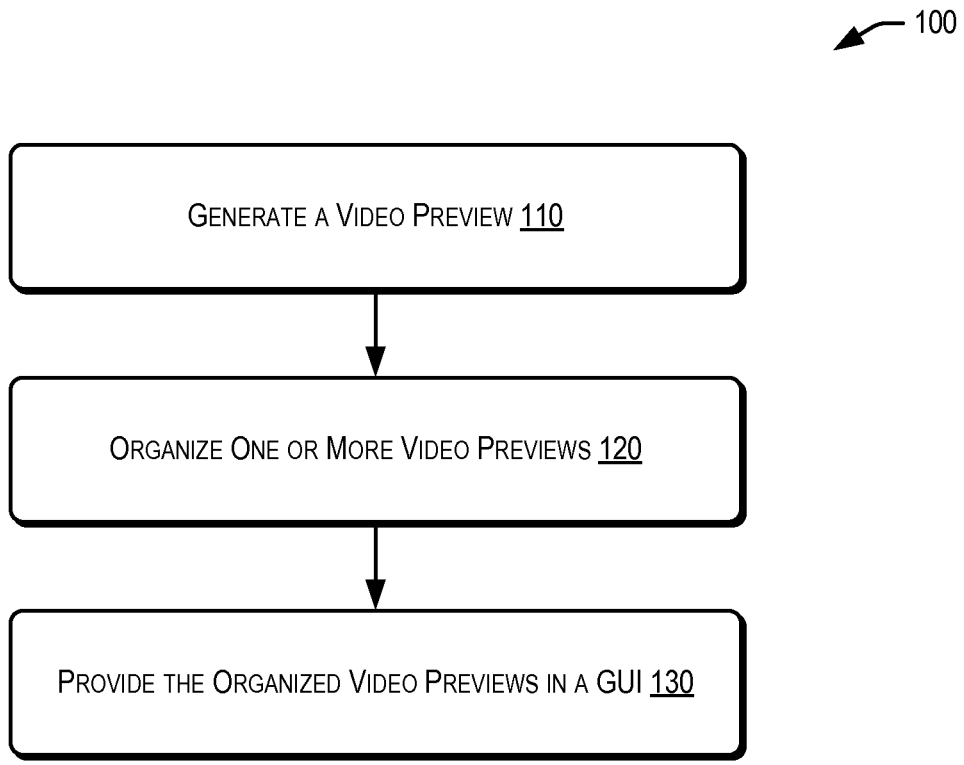
FIG. 1 shows a flowchart illustrating a method of creating a video preview, organizing the video previews, and providing a user interface that includes the video previews according to an embodiment of the present invention.

FIG. 1 shows a flowchart illustrating a method 100 of creating a video preview, organizing the video previews, and providing a user interface that includes the video previews according to an embodiment of the present invention. The method 100 may comprise a plurality of steps for implementing an embodiment of creating a video preview with a duration of a predetermined length of time. Various computing devices may be used to perform the steps of the method, including video servers, provider servers, user devices, or third party servers.

At step 110, a video preview may be generated. Embodiments of the invention may provide a graphical user interface for a user that allows the user to activate a request to generate a video preview from a full video. The system may generate the video preview based a timestamp in the full video identified by the user, such that the generated video preview is created from a full video based on the timestamp. The duration of the video preview can be a predetermined length of time and adjusted (e.g., altered, moved, shortened) at a later time. The video preview may be created to convey the essence of the full video (e.g., the user may select the best 1-10 seconds of a video, like a building imploding or a snowboarder jumping off of a cliff).

Additional means of generating video previews can be found in U.S. patent application Ser. No. 14/173,697, entitled "Video Creation with Link", U.S. patent application Ser. No. 14/173,732, entitled "Video Preview Creation based on Environment", and U.S. patent application Ser. No. 14/173,740, entitled "Video Preview Creation with Audio", which are incorporated by reference in their entirety.

At step 120, one or more video previews may be organized into one or more channels or collections. For example, the method 100 can associate the video preview generated in step 110 (e.g., a 4-second animated GIF of a snowboarder jumping off a ledge) with a channel (e.g., a collection of videos about snowboarders). In some embodiments, the video previews may be organized in a group (e.g., a composite, a playable group, a cluster of video previews) and displayed on a network page. Additional information about the organization and layout of video previews can be found in U.S. patent application Ser. No. 14/173,745, entitled "Generation of Layout of Videos", which is incorporated by reference in its entirety.

At step 130, a GUI may be provided with the video previews. For example, the GUI may provide one or more channels (e.g., channel relating to snowboarders, channel relating to counter cultures), one or more videos within a channel (e.g., a first snowboarding video, a second snowboarding video, and a first counter culture video), or a network page displaying one or more video previews. The video previews may be shared through social networking pages, text messaging, or other means. Additional information about viewing and sharing video previews can be found in U.S. patent application Ser. No. 14/173,753, entitled "Activating a Video Based on Location in Screen", which is incorporated by reference in its entirety.

II. System for Providing Video Previews

Various systems and computing devices can be involved with various workflows used to create a video preview using an interface (e.g., a graphical user interface).

A. System for Generating Video Previews

Figure 2:
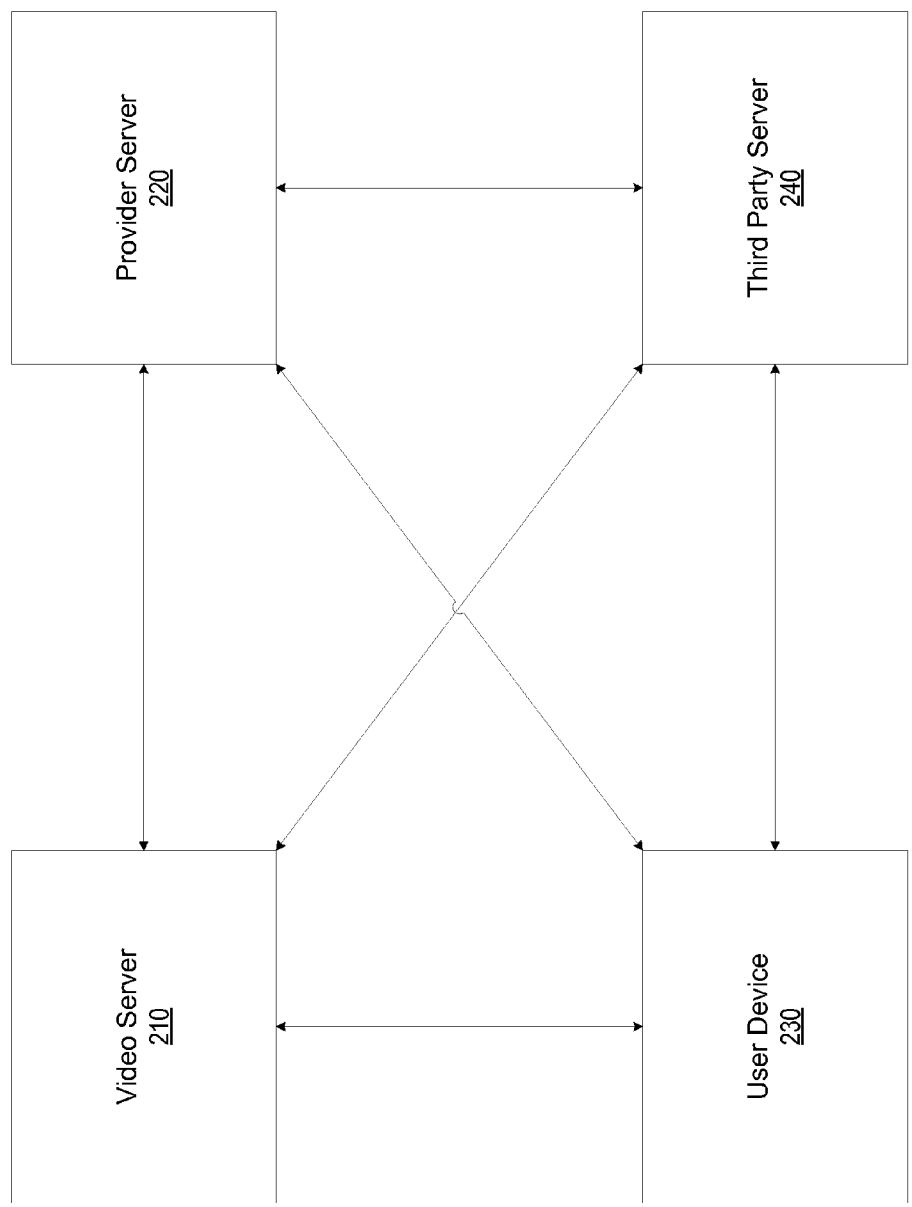
FIG. 2 shows block diagrams of various subsystems used to generate or provide a video preview.

FIG. 2 shows block diagrams of various subsystems used to generate or provide a video preview. For example, the computing devices can include a video server 210, a provider server 220, a user device 230, or a third party server 240 according to an embodiment of the present invention. In some embodiments, any or all of these servers, subsystems, or devices may be considered a computing device.

Computing devices may include a mobile phone, a smart phone, a personal digital assistant (PDA), a laptop computer, a desktop computer, a thin-client device, a tablet PC, server computer(s), or one more virtual machines implemented in a hosted computing environment. In one illustrative configuration, the computing devices may include at least one memory and one or more processing units or processor(s). The processor(s) may be implemented as appropriate in hardware, computer-executable instructions, firmware, or combinations thereof. Computer-executable instruction or firmware implementations of the processor(s) may include computer-executable or machine-executable instructions written in any suitable programming language to perform the various functions described. The computing devices may also include geo-location devices (e.g., a global positioning system (GPS) device or the like) for providing and/or recording geographic location information associated with the computing devices.

The memory may store program instructions that are loadable and executable on the processor(s), as well as data generated during the execution of these programs. Depending on the configuration and type of computing device, the memory may be volatile (e.g., random access memory (RAM)) and/or non-volatile (e.g., read-only memory (ROM), flash memory). The computing device may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory may include multiple different types of memory, such as static random access memory (SRAM), dynamic random access memory (DRAM), or ROM.

In some embodiments, the video server 210 can provide, transmit, and store full videos and/or video previews (e.g., Ooyala®, Brightcove®, Vimeo®, YouTube®, CNN®, NFL®, Hulu®, Vevo®). The video server 210 can support transcoding functionality. In some embodiments, the video server 210 can be a video-sharing website on which users can upload, view, and share videos. The video server may display a wide variety of user-generated and third party-generated video content, including video clips, television clips, musical videos, and amateur content such as video blogging, short original videos, and educational videos. The video server 210 may include registered and/or unregistered user access to upload or view various full videos and/or video previews.

The provider server 220 can interact with the video server 210 to provide the video previews. In some embodiments, the provider server 220 can receive information to generate the video preview (e.g., a timestamp to a full video, a full video file, a timestamp to a location in the full video, one or more portions of a full video, an identification of a full video at the video server 210). The provider server 220 can identify a timestamp in a full video (e.g., received from a user device 230, generated and identified at a provider server). The provider server 220 may provide one or more software applications or hardware that users or third parties can use to identify timestamp(s) in the full videos to use to generate the video previews.

The user device 230 can receive a video preview and/or full video and transmit information (e.g., a timestamp) to generate the video preview from the full video. A user device 230 can identify a timestamp in a full video. In some embodiments, the user device 230 may also be used to view, browse, or store the generated video previews.

The third party server 240 can also receive a video preview and/or full video and transmit information (e.g., a timestamp) to generate the video preview from the full video. In some embodiments, the third party server 240 may also be used to view or browse the generated video previews.

The video server 210, provider server 220, a user device 230, and third party server 240 may communicate via one or more networks. The networks may include any one or a combination of many different types of networks, such as cable networks, the Internet, wireless networks, cellular networks and other private and/or public networks. It is also noted that the described techniques may apply in other client/server arrangements (e.g., set-top boxes, game consoles), as well as in non-client/server arrangements (e.g., locally stored applications).

In some embodiments, the video server 210, provider server 220, a user device 230, and third party server 240 can be used to create a video preview with a predetermined length of time (e.g., in a full video). For example, the computing device (e.g., a provider server 220) may receive an activation of a request to generate the video preview from another computing device (e.g., user device 230). The request may also include identifying information of the full video, one or more timestamps, identification of a location in the full video (e.g., at minute 1:10 of a 3:00 minute video), or other identification.

The video previews or full videos may be stored in a database (e.g., at the computing device). The database may include a copy of the video preview and any information associated with the video preview (e.g., tags, captions, run time, shares). The database may be searchable. The database may be key/value based, or defined in a table format.

B. System for Generating Video Previews at a Provider Server

In some embodiments, the video server 210 may transmit a full video to a user device 230 through a graphical user interface (GUI). The GUI can include a request tool (e.g., button, message server, activation tool) that allows the user device 230 to indicate a timestamp in the video preview.

The user device 230 may activate the timestamp by activating (e.g., clicking, tapping, selecting) the request tool provided by the GUI. The timestamp can be used to indicate at least a portion of the full video that the user would like to use to create a video preview. The timestamp is identified at the user device 230 and can be transmitted to the provider server 220 to generate the video preview. For example, the user device 230 may activate the request tool provided by the video server 210 and generate the timestamp locally at the user device 230. In another example, the user device 230 may activate the request tool provided locally at the user device (e.g., via a software application, "app") and generate a timestamp locally at the user device 230. The request tool may generate a request signal that includes the timestamp and transmit the request signal from the user device to the provide server 220.

In some embodiments, the request button is selected multiple times to identify a plurality of timestamps. For example, the activation can identify a start time and end time, the user may wait for a particular amount of time and activate the request tool again. The activation may identify a second start time and end time. In some embodiments, the duration of the full video from the first start and end time and the duration of the full video from the second start and end time can be combined (e.g., concatenated, added, removed, overlapped) to create a single video preview. The plurality of timestamps can be transmitted to the provider server 220 and the provider server can request multiple portions of a full video and/or a plurality of full videos (e.g., from the video server 210).

In some embodiments, the request button may indicate the position at the end and/or middle of the full video to use to create the video preview (e.g., select the request button at 1:05 to generate a video preview of 1:00 to 1:05, select the request button at 1:05 to generate a video preview of 1:00 to 1:10). In some embodiments, the request button may indicate a position at the beginning of the full video and the user device may select the request button a second time to indicate the end of the full video to use for the video preview.

The user device 230 can transmit the timestamp and a reference to the full video to the provider server 220. For example, the request tool may be configured to transmit the timestamp associated with the activation of the request to the provider server 220. In some examples, the timestamp identified by the user device 230 can be transmitted to the provider server with a reference (e.g., link) to the full video, a start time, and/or length of the desired video preview.

In some embodiments, the user device 230 may generate a webserver request. The webserver request can include a litany of information for the webserver, including a timestamp, the user's internet protocol (IP) address, a user-agent string of the browser, cookies, a user's user identifier (ID), and other information. A user-agent string, for example, may include information about a user device 230 in order for the webserver to choose or limit content based on the known capabilities of a particular version of the user device 230 (e.g., client software). The provider server 220 can receive this and other information from the user device 230.

The provider server 220 may request a full video based in part on the information received from the user device 230. For example, the provider server 220 can transmit a request (e.g., email, file, message) to the video server 210 that references the full video (e.g., link, identifier) referenced by the user device 230. In some examples, the video server 210 and provider server 220 may be connected through a direct and/or secure connection in order to retrieve the video (e.g., MP4 file, stream, full video portion).

In some embodiments, the request may vary depending on the type video needed for the full video or requested video preview. For example, the full video may be a raw MP4 format (e.g., compressed using advanced audio coding (AAC) encoding, Apple Lossless format). The provider server 220 can determine that the desired format for the user device 230 is an animated GIF and request additional information from the video server 210 in order to transcode the MP4 format to an animated GIF format for the user device 230.

The video server 210 may transmit the full video (e.g., file, link) to the provider server 220. When the provider server 220 receives the full video, the provider server 220 may generate the video preview in a variety of ways, including using encoding, transcoding, re-encoding, or generating a lossless copy of the video.

In some embodiments, the provider server 220 may generate the video preview through the use of keyframes (e.g., i-frames). For example, the provider server 220 can generate a video preview by transcoding the image data to the first keyframe. After the first keyframe, the provider server 220 can generate a lossless copy of the data starting at a particular start time and ending at a particular end time (e.g., based on a timestamp, based on a predetermined length of time, based on particular information displayed in the image data). In some processes, the method may ensure the final product is correctly encoded without sacrificing significant processing time by transcoding the entire video.

The provider server 220 provides the video preview to the user device 230. The video preview may be provided using various methods. For example, the video preview can be transmitted as a link via a messaging service to the user device 230, as a video preview file in an attachment, provided through a GUI accessible by the user device, or other methods. In some embodiments, the video preview (e.g., file, animated GIF, link to a video preview) may be stored in a temporary location (e.g., clipboard, temporary data buffer) at a user device 230 after the video preview is generated. The user may copy/paste the video preview to an email client, SMS, or other application in order to use or share the video with other applications and/or devices.

The video preview can be provided to the user device 230 in a variety of formats. For example, the video preview can be provided as a link to a stored file on a webserver and/or the provider server 220, an animated GIF file, an MP4 file, or other acceptable file format. In some examples, the video preview can be provided in a format based in part on a particular type of user device 230 (e.g. Apple iPhones can receive a MPEG-4 formatted file, Android machines can receive an AVI formatted file). The user device 230 may provide information (e.g., device type, operating system) to the provider server 220 prior to receiving the properly formatted video preview.

In some embodiments, the provider server 220 may provide a GUI that allows the user device to access one or more social networking platforms (e.g., Facebook®, Twitter®, Google+®, Tumblr®) so that the video preview can be uploaded directly to the social networking website.

C. System for Generating Video Previews with a Partial Fetch

The video server 210 can provide a full video to the user device 230. For example, the user device 230 requests to generate a video preview by activating a request (e.g., via a webpage, via a GUI). The request can initiate a transmission of the timestamp and a reference to the full video to the provider server 220.

When the video server 210 supports transcoding functionality, the provider server 220 transmits a reference to the full video and/or a reference to a portion of the full video. For example, when the video server 210 supports transcoding functionality (e.g., via FFmpeg a type of transcoding software), the provider server 220 can provide a reference to the full video and a reference to the portion of the video that the provider server 220 would like to receive (e.g., "partial fetch" of the full video). The video server 210 can identify the full video (e.g., stored by the video server 210) and the portion requested by the provider server 220 from the request.

The video server 210 transmits (and/or the provider server 220 requests) only the portion of the full video (e.g., the portion of the full video requested by the provider server 220). In some embodiments, when the provider server 220 receives the portion of the full video, the provider server 220 can store a backup of the portion of the full video or store a backup of the video preview. The provider server 220 may store the full video and/or video preview locally, on a distributed/cloud data store, or via a remotely accessible data store.

In some embodiments, the video server 210 provides the full video or a portion of the full video to the provider server 220 automatically (e.g., via a push notification by Microsoft Exchange). In this embodiment, the provider server 220 may not request a full video or other information from the video server 210. Instead, the provider server 220 can receive the full video or a portion of the full video in response to a push notification without first requesting the full video or a portion of the full video.

The provider server 220 can transmit the video preview to the user device 230. In some embodiments, the provider server 220 can discard the portion of the full video or video preview (e.g., and the affiliated files, metadata, or information) after the video preview has been generated and transmitted to the user device 230.

D. System for Generating Video Previews from a Streaming Full Video

The provider server 220 may allow the user device 230 to generate a video preview from a streaming full video. For example, the video server 210 may provide a traditional television broadcast transmitted through an IP network. In this case, the streaming video is provided to the user device 230 from the video server 210. The user device 230 activates a request a first time to start buffering the streaming video at the provider server 220. The provider server 220 requests the streaming video from the video server 210. The video server 210 provides the streaming video to the provider server 220 and begins storing the video data (e.g., buffering). The user device 230 activates the request a second time to notify the provider server to stop buffering the streaming video. The provider server 220 generates the video preview based in part on the video received between the first and second request. The provider server 220 may then provide the video preview of the streaming video to the user device 230.

In some embodiments, the user device 230 activates a request only one time to identify a timestamp. The provider server 220 can similarly request and receive the streaming video to start buffering the streaming video at the provider server 220, but generate a video preview based on a predetermined length of time. In some embodiments, the provider server 220 may be storing the streaming video irrespective of the activation of the request. When the provider server 220 receives the activation of the request, the provider server can identify a timestamp in the full video corresponding to the request and generate a video preview assuming that the activation identifies the end time (e.g., or middle or beginning) of the video preview. Using a predetermined length of time, the provider server 220 can use the stored portion of the full video before the provider server received the activation and automatically identify the start time (e.g., or end time). The provider server 220 can generate the video preview based on the predetermined length of time and provide the video preview to the user device 230.

E. System for Providing the Video Preview Through a Video Server

The video server 210, instead of a provider server 220, can provide the video preview to the user device 230. For example, the provider server 220 can receive the full video (e.g., in response to a user request, in response to a push notification). The provider server 220 can generate the video preview from the full video (e.g., based on a timestamp, using a predetermined portion of the video preview) and provide the video preview to the video server 210. The video server 210 can provide the video preview to a user device 230.

The video server 210 may provide the video preview in various formats. For example, the video server 210 can provide the video preview as an additional link stored with the video server (e.g., when the video preview is uploaded to the video server 210 from the provider server 220). In another example, the video preview can be transmitted as a link to the full video with instructions. The instructions can identify for a web browser, software application, or user device which portion of the full video to play and/or repeat for the video preview. In yet another example, the video preview may be provided as an attachment to a message, provided through a GUI accessible by the user device, or other methods. In another example, the video server 210 can store the generated video preview at the video server 210 and provide the video preview (or link to the video preview) to the user device 230 as a pre-encoded video preview from the provider server 220.

F. System for User Device-Generated Video Previews Provided by a Video Server

The user device 230 can generate a video preview locally (e.g., using a software application or "app"). The user device 230 may first access an "app store" or some provider of software applications. The user device 230 can receive an executable file, so that the user device 230 is enabled to generate video previews. After installation, the software application on the user device can communicate with the video server 210 to receive a full video at the user device 230. The user device 230 may activate a request provided by the software application to generate a timestamp, a start time, and/or length of the desired video preview. The software application can use the full video (e.g., MP4 file, stream, full video portion) to generate the video preview (e.g., by transcoding the full video, by using a portion of the encoded full video).

The user device 230 can transmit the generated video preview to the provider server 220 or use the generated video preview locally at the user device. In some embodiments, the provider server 220 can store a backup of the video preview and/or help the user device distribute the generated video preview (e.g., via social networking, using a distributed database).

In some embodiments, the video preview (e.g., file, animated GIF, link to a video preview) may be stored in a temporary location (e.g., clipboard, temporary data buffer) or at another location on a user device 230 (e.g., cache, removable storage device) determined by the software application. The user may copy/paste the video preview to an email client, SMS, or other application in order to use or share the video with other applications and/or devices.

In some embodiments, user device 230 may include a software application to interact with the provider server 220, so that the provider server 220 generates the video preview and transmits the generated video preview to the user device 230. For example, the user device 230 may first access an "app store" or some provider of software applications. The user device 230 can receive an executable file, so that the user device 230 is enabled to generate video previews. After installation, the video server 210 can transmit a full video to the user device 230 at the software application, instead of transmitting the full video to a GUI displayed on a webpage. The user device 230 can activate the request button provided by the software application to identify the timestamp. The user device 230 can transmit the timestamp, reference to the full video, or other information (e.g., user device ID, IP address, cookies, start time, length of the desired video preview) to the provider server. The provider server 220 may request and receive a full video. The provider server 220 can then provide the video preview to the user device 230 via the software application.

G. System for Video Previews Through a Third Party

The third party server 240 can generate a video preview and/or gauge the interaction with the video preview by users. For example, the third party server 240 may first access an "app store" or some provider of software applications. The third party server 240 can receive an executable file, so that the third party server 240 is enabled to generate video previews. After installation (e.g., on a server, on a webpage provided by the third party server), the software application can communicate with the video server 210 to receive a full video at the third party server 240. The third party server 240 may activate a request provided by the software application to generate a timestamp, a start time, and/or length of the desired video preview. The software application can use the full video (e.g., MP4 file, stream, full video portion) to generate the video preview (e.g., by transcoding the full video, by using a portion of the encoded full video).

The third party server 240 can transmit the generated video preview to the provider server 220 or use the generated video preview locally at the third party server 240 or webpage provided by the third party server. In some embodiments, the provider server 220 can store a backup of the video preview and/or help the third party server 240 distribute the generated video preview (e.g., via social networking, using a distributed database).

In some embodiments, the video preview (e.g., file, animated GIF, link to a video preview) may be stored in a temporary location (e.g., clipboard, temporary data buffer) or at another location on a third party server 240 (e.g., cache, removable storage device) determined by the software application.

In some embodiments, third party server 240 may include a software application to interact with the provider server 220, so that the provider server 220 generates the video preview for the third party server 240. For example, the third party server 240 may first access an "app store" or some provider of software applications. The third party server 240 can receive an executable file, so that the third party server 240 is enabled to generate video previews. After installation, the video server 210 can transmit a full video to the third party server 240 at the software application, instead of transmitting the full video to a GUI displayed on a webpage. The third party server 240 can activate the request button provided by the software application to identify the timestamp. The third party server 240 can transmit the timestamp, reference to the full video, or other information (e.g., user device ID, IP address, cookies, start time, length of the desired video preview) to the provider server. The provider server 220 may request and receive a full video. The provider server 220 can then provide the video preview to the third party server 240 (or webpage, or other computing device) via the software application.

H. System for Video Previews Generated by a User Device

In this embodiment, the user device 230 generates the full video independent of the video server 210. The user device 230 transmits the full video to the provider server 220, instead of transmitting a reference to the full video. The provider server 220 can generate the video preview (e.g., via transcoding) and provide the video preview to the user device 230. In some embodiments, the user device 230 can generate the video preview or upload the video preview to the video server 210.

I. User-Generated Video Preview at a Video Server

In some embodiments, the video server 210 may generate the full video and/or video preview without diverting from the essence of the disclosure.

III. Specifying a Video Preview

Figure 3A:
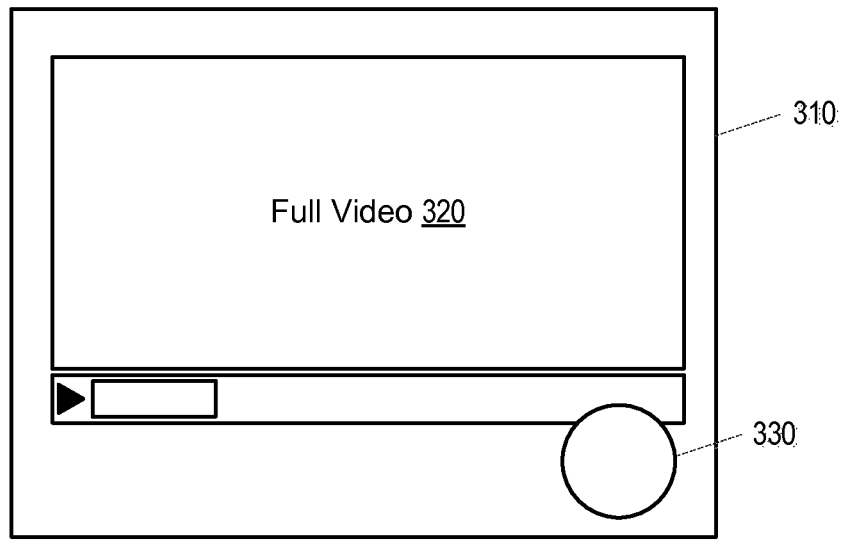
FIGS. 3A-3B show graphical user interfaces used to generate or provide a video preview according to an embodiment of the present invention.
Figure 3B:
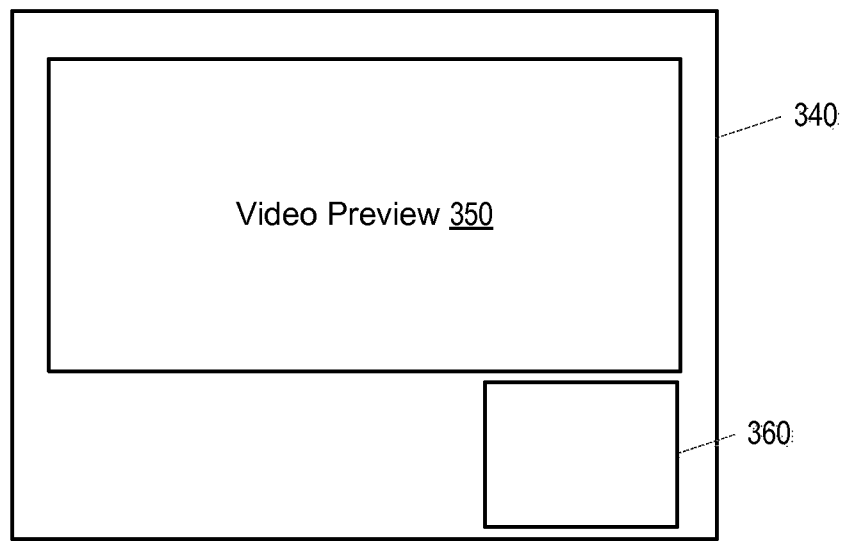

FIGS. 3A-3B show graphical user interface used to generate or provide a video preview according to an embodiment of the present invention. The GUIs 310, 340 (e.g., provided by a webpage or application, provided by a computing device like a provider server 220 or third party server 240) can include a full video 320, request tool 330, video preview 350, and provider tool 360. In some embodiments, the GUIs 310, 340 may be the same GUI or overlaid on top of each other. For example, the GUI 310 may be displayed with the full video 320. When the request tool 330 is activated, the GUI 340 may overlay or appear with the video preview 350 and the provider tool 360. GUIs 310 and 340 can run on a user device.

A. Displaying a Full Video

The GUI 310 may display a full video 320. For example, the full video 320 may be provided in a GUI 310 (e.g., frame of a website). The full video may be activated (e.g., a play button has been selected) and begin to play (e.g., within the frame, at another location associated with GUI 310, by another GUI).

The GUI 310 may also display a request tool 330. The request tool 330 can be activated or selected to activate a video preview creation process. For example, the video preview creation process can generate a request to generate a video preview. In some embodiments, the activation of request tool 330 may transmit a request signal to generate a video preview to a computing device (e.g., a provider server 220 or a same user device on which a GUI is running). The request signal can include a link to the full video, e.g., the link can be sent to preview generation module running on the user device or a server.

In some embodiments, the activation of the request tool 330 may identify a timestamp in the full video (e.g., included in the request to the computing device). For example, if the request tool 330 was activated at 1:05 in a 2 minute full video, the timestamp may comprise the value 1:05. In another example, the request signal to the computing device includes "1:05" and an identification of the full video (e.g., the name of the full video, the location).

The length of the video preview may correspond with a predetermined length of time. In one embodiment, when the user activates the request tool 330, the user would not need to specify (e.g., provide) the amount of time that the user would like to use to generate the video preview. In another embodiment, request tool 330 can include different buttons for different amounts of time (e.g., one button for a 15 second video preview, one button for a 5 second video preview, one button for a video preview of the last 10 seconds of the full video). In this manner, the length of time can be specified, but the user does not need to specify the duration of time via another action.

In some embodiments, the length of the video preview may correspond with a request from the user. For example, the user can activate the request tool 330 a first time to identify the start of a video preview and activate the request tool 330 a second time to identify the end of a video preview. Either the first time or the second time may be the timestamp, and in some cases, the timestamp may include the range of time between the first and second activation.

B. Viewing the Video Preview

The timestamp can be used to generate the video preview. For example, the timestamp can be transmitted from one computing device to another (e.g., from the user device 230 to the provider server 220 where the provider server 220 generates the video preview). In another example, the timestamp can be transmitted from the user device 230 to the provider server 220, the provider server 220 can generate the video preview, and the provider server 220 can transmit the video preview back to the user device 230.

In some embodiments, the video preview may be displayed. Once video preview 350 has been generated, GUI 340 can display a video preview 350 (e.g., after the computing device generates the video preview, for editing purposes, after a separate request is made). For example, video preview 350 can be displayed on the website, and the website may provide an option to share the video preview 360. In some embodiments, the computing device (e.g., provider server 220) may transmit the video preview to the GUI 340 to display, upload the video preview to the website, and/or store the video preview file at the GUI 340 so the GUI can host the content. This may cause the GUI 340 to transmit the locally-hosted video preview to the computing device (e.g., user device 230), so that the device can receive the video preview as a file. In some embodiments, the website may provide the video preview as a link to the computing device, so that the device can access the video preview by selecting and/or activating the received link. In some embodiments, the computing device may transmit instructions for playing the video preview to the GUI 340 or encode the video preview with the instructions on how the video preview is configured to play, so that when the GUI 340 provides the video preview to the computing device, the computing device can receive the video preview (e.g., link, file) and instructions on how to receive the video preview (e.g., playing 15 seconds of a full video, follow a link to access the video preview). In some examples, the instructions may define a portion of a full video and/or video preview to loop (e.g., repeat) as well.

The GUI 340 may provide the video preview to the device via a publicly inaccessible website as well (e.g., provided by a provider server 220). For example, the provider server can store the video preview at a data store (e.g., host the video preview file) and provide a privately accessible link to the video preview and/or video preview file to the device. In some examples, the provider server can transmit the locally-hosted video preview to the device, so that the device can receive the video preview as a file. In some examples, the website may temporarily host the video preview and provide the video preview to the user upon request.

The video preview can be shared via several messaging services accessible through a toolbar on the website, including iMessage®, short message service (SMS), or e-mail. In some embodiments, the video preview may be provided via the messaging service from either the publicly accessible source (e.g., YouTube®) or the publicly inaccessible source (e.g., the provider server), so that the video preview is accessible by user devices regardless of the source of the data.

Figure 4:
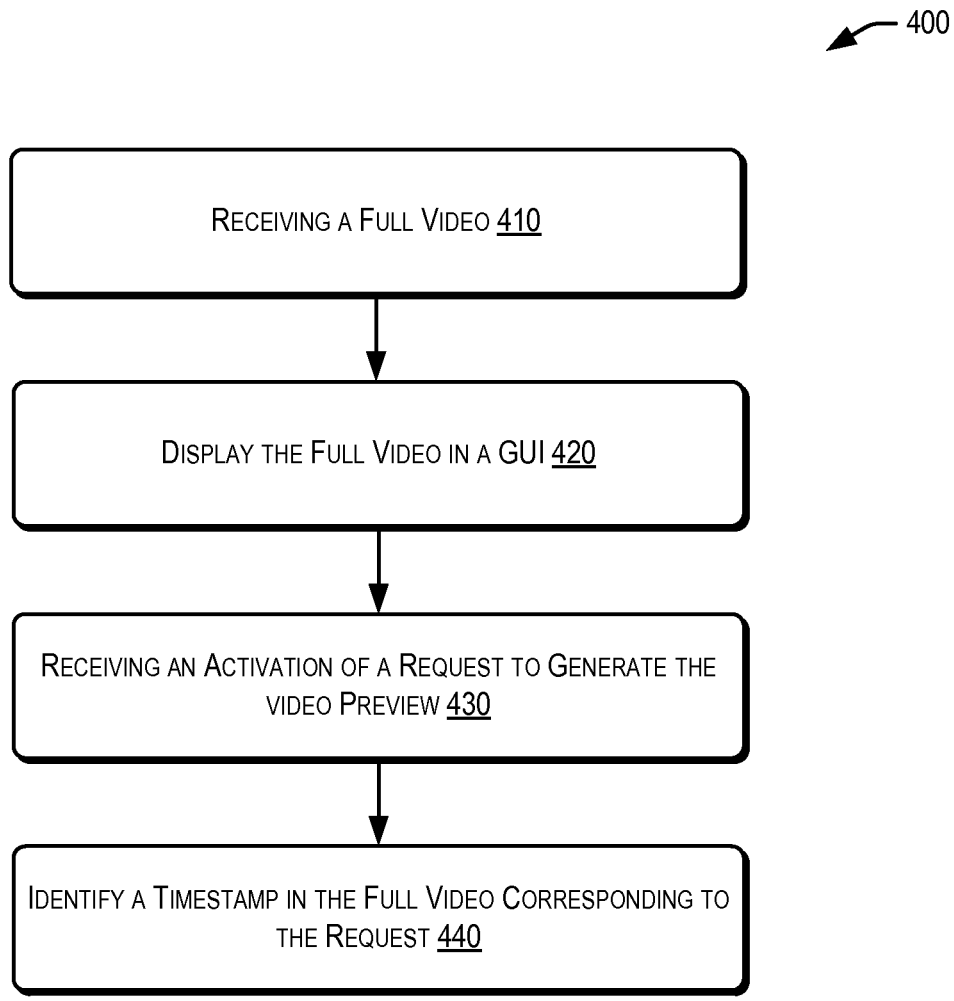
FIG. 4 shows a flowchart illustrating a method of identifying a video preview by a provider server according to an embodiment of the present invention.

FIG. 4 shows a flowchart illustrating a method of identifying a video preview by a provider server according to an embodiment of the present invention. The method 400 may be performed by any computing device including a video server 210, provider server 220, user device 230, or third party server 240.

At block 410, a full video may be received. For example, the full video can be received from a computing device (e.g., a video server 210, a provider server 220) at another computing device (e.g., user device 230, third party server 240). The full video may be in any standard video format (e.g., graphics interchange format (GIF), animated GIF, audio video interleaved format (AVI), windows media video format (WMV)). The full video may include the entire full video, portion(s) of the full video, or an identification of the full video at another location (e.g., the video server 210). The full video (e.g., used to generate a video preview) can be a portion of a longer full video. The full video may be generated from the longer full video. In some instances, the video preview can be a shorter duration than the full video.

In some embodiments, the full video is generated by a computing device, including a user device 230, third party server 240, and stored in a storage device. The storage device may include a data store, database, temporary storage (e.g., temporary buffer at the user device), remote/local storage, storage associated with a television, storage associated with a game console, or storage associated with a computing device.

In some embodiments, the full video is a streaming video, such that when the full video is received, at least a portion of the full video is received as a streaming transmission. For example, the full video may be received as portion of images (e.g., some portion of the full video for a time duration, including one second at a time or near real time).

At block 420, the full video may be displayed in a GUI (e.g., of the user device 230). The GUI can provide a request tool, activation tool, or other activation objects used to help generate a video preview. The plurality of activation objects may correspond with different predetermined lengths of time (e.g., one button for a 15 second video preview, one button for a 5 second video preview, one button for a video preview of the last 10 seconds of the full video).

In some embodiments, a portion of the full video may be received (e.g., instead of the complete full video). For example, a computing device may request at least a portion of the full video identified in a request or identified with a timestamp. The computing device can receive the portion of the full video associated with the request.

At block 430, an activation can be received. The activation can include the activation of a request to generate the video preview from a user device. In some examples, the activation is a single activation that identifies a start time and stop time in the full video. The activation may specify the predetermined length of time. In some examples, the activation will not include the predetermined length of time and the computing device will determine the predetermined length of time to associate with the request.

The activation may be initiated using a variety of methods. For example, the request can be activated by selecting a button embedded with the GUI of the user device. In another example, the request can be activated by selecting a button embedded with a graphical user interface (GUI) of a third party.

At block 440, a timestamp in a full video may be identified. For example, the timestamp in the full video can correspond to when the request was activated by the user device. The timestamp can specify the video preview and the video preview can be created from the full video based on the timestamp. The duration of the video preview may be a predetermined length of time.

In some embodiments, the timestamp can correspond to the stop time and the predetermined length of time can specify the start time. For example, when the user activates a request to generate a video preview from a full video, the request may be identified at 2:11 of a 3:00 video. When the predetermined length of time is 10 seconds, the start time may be 2:01 and the end time may be 2:11. In some embodiments, the predetermined length of time is 15 seconds or some other predetermined length of time. When the video preview is created, the timestamp of the location in the full video is at the end of the video preview. The predetermined length of time can be selected by a curator, user, or automated process. In some embodiments, the predetermined length of time can be the most popular activation tool selected, when more than one activation tool is available for users. In some embodiments, the predetermined length of time is stored (e.g., in a data store, in a temporary storage), used for all videos, or is defined for videos based on identifiers associated with the video (e.g., categories, metadata, full video origin).

In some embodiments, the timestamp of the location in the full video is centered in the video preview. For example, the timestamp can be at 1:20 of a 2:00 full video and the predetermined length of time may be 20 seconds. The Video preview can correspond with 1:20 to 1:40 of the full video.

In some embodiments, timestamp can correlate to a location in the full video that the user likes (e.g., after the user views a portion of the full video). For example, the timestamp can be received in response to the user activating the request (e.g., when the snowboarder jumps off of a cliff in a snowboarding video). In some embodiments, the timestamp can be transmitted to a server or the user device, which may not be originally associated with the full video. The request to generate the video preview can include the timestamp of a location in the full video that the user liked and the timestamp can specify the video preview.

More than one timestamp may be received. For example, when two timestamps are received, the video preview can be created using the two timestamps. In one example, the video preview can begin at a first timestamp and end at the second timestamp. In another example, the plurality of timestamps can correspond to a plurality of portions of the full video (e.g., one timestamp at 0:30, one timestamp at 1:04). The portions of the full video can be retrieved and used to generate the video preview (e.g., by concatenating the plurality of portions of the full video).

In some embodiments, the timestamp can be used by the user device 230 to generate the video preview locally (e.g., the timestamp is not transmitted to the provider server 220). In other embodiments, the timestamp can be transmitted to a GUI (e.g., located anywhere) so that a computing device associated with the GUI can generate the video preview using the timestamp. In some embodiments, the timestamp and/or full video may be transmitted (e.g., to the provider server 220, to the video server 210). For example, the method may provide the video preview once the video preview has been created. The method can confirm from the user device, that the video preview is acceptable and receive a response from the user device. When the response indicates that the video preview is acceptable, the method may send a message to a computing device (e.g., a provider server 220) that includes the video preview and a link to the full video. In some examples, the link to the full video can be generated and shared by pasting the link in a message transmitted by the user device via a network.

In some embodiments, the duration of the video preview may also be adjusted. For example, when the user receives the transmitted video preview, the computing device can generate a response requesting an adjusted duration. The response can indicate a shorter length for the video preview. In response to the request, a second video preview having the shorter length can be generated.

IV. Generating a Video Preview

A video preview may be generated by a provider server 220, user device 230, or video server 210. In some embodiments, a third party server 240 may generate a video preview using a similar process as a user device 230.

In some embodiments, the video preview may be created from the portion of the full video based on the timestamp and a duration of the video preview can be a predetermined length of time. For example, the predetermined length of time (e.g., 15 seconds) can be determined by retrieving a value corresponding to the time from a database or receiving the value from particular website.

A. By a Provider Server

Figure 5:
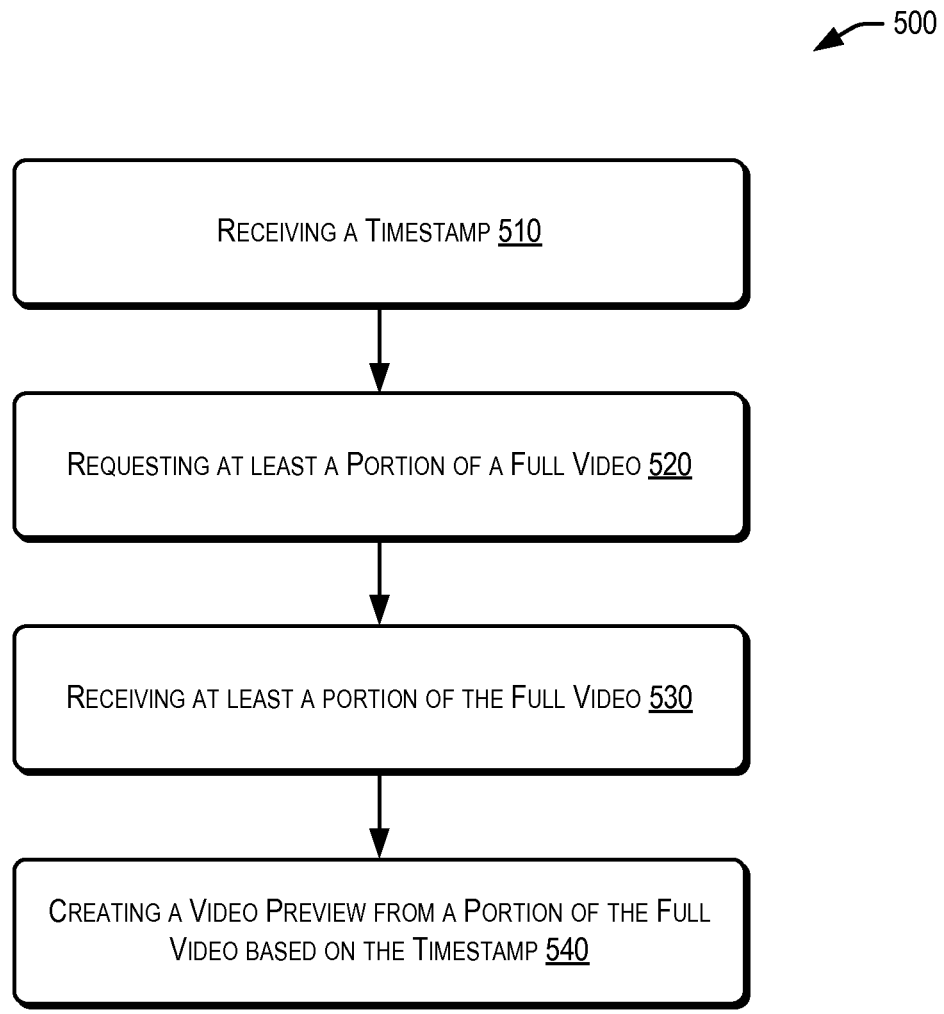
FIG. 5 shows a flowchart illustrating a method of generating a video preview by a provider server according to an embodiment of the present invention.

FIG. 5 shows a flowchart illustrating a method of generating a video preview by a provider server according to an embodiment of the present invention. The method 500 may be implemented by a computing device (e.g., a provider server 220).

At block 510, a timestamp may be received. For example, a user device 230 can identify a timestamp in a full video at the user device 230 and transmit the timestamp to the provider server 220. The timestamp can be a location in a full video. The timestamp can be obtained in response to a user viewing at least a portion of the full video at the computing device (e.g., user device 230) within a GUI, where the timestamp specifies the video preview.

In another example, the user device 230 can transmit the timestamp and a reference to the full video to the provider server 220 using a request tool. The request tool may be configured to transmit the timestamp associated with the activation of the request to the provider server 220. In some examples, the timestamp identified by the user device 230 can be transmitted to the provider server with a reference (e.g., link) to the full video, a start time, and/or length of the desired video preview.

In some embodiments, the user device 230 may generate a webserver request that is received by the provider server 220. The webserver request can include a litany of information for the webserver, including the timestamp. The webserver request may also include the user's internet protocol (IP) address, a user-agent string of the browser, cookies, a user's user identifier (ID), and other information. A user-agent string, for example, may include information about a user device 230 in order for the webserver to choose or limit content based on the known capabilities of a particular version of the user device 230 (e.g., client software). The provider server 220 can receive this and other information from the user device 230.

At block 520, at least a portion of a full video may be requested. For example, the provider server 220 may request a full video based in part on the information received from the user device 230. For example, the provider server 220 can transmit a request (e.g., email, file, message) to the video server 210 that references the full video (e.g., link, identifier) referenced by the user device 230. In some examples, the video server 210 and provider server 220 may be connected through a direct and/or secure connection in order to retrieve the video (e.g., MP4 file, stream, full video portion).

At block 530, the at least a portion of the full video may be received. In some examples, the provider server 220 receives only the portion of the full video (e.g., the portion of the full video requested by the provider server 220). In some embodiments, when the provider server 220 receives the portion of the full video, the provider server 220 can store a backup of the portion of the full video or store a backup of the video preview. The provider server 220 may store the full video and/or video preview locally, on a distributed/cloud data store, or via a remotely accessible data store.

In some embodiments, a full video can be received later in the process (e.g., after the computing device receives the timestamp, after the computing device receives an identification of a full video).

In some embodiments, the provider server 220 receives the full video or a portion of the full video automatically (e.g., via a push notification by Microsoft Exchange). In this embodiment, the provider server 220 may not request a full video or other information from the video server 210. Instead, the provider server 220 can receive the full video or a portion of the full video in response to a push notification without first requesting the full video or a portion of the full video.

At block 540, a video preview may be created from a portion of the full video based on the timestamp. For example, the provider server 220 may generate the video preview in a variety of ways, including using encoding, transcoding, re-encoding, or generating a lossless copy of the video.

In some embodiments, the timestamp can correspond to the stop time and the predetermined length of time can specify the start time. For example, when the user activates a request to generate a video preview from a full video, the request may be identified at 2:11 of a 3:00 video. When the predetermined length of time is 10 seconds, the start time may be 2:01 and the end time may be 2:11. In some embodiments, the predetermined length of time is 15 seconds or some other predetermined length of time. When the video preview is created, the timestamp of the location in the full video is at the end of the video preview. The predetermined length of time can be selected by a curator, user, or automated process. In some embodiments, the predetermined length of time can be the most popular activation tool selected, when more than one activation tool is available for users. In some embodiments, the predetermined length of time is stored (e.g., in a data store, in a temporary storage), used for all videos, or is defined for videos based on identifiers associated with the video (e.g., categories, metadata, full video origin).

In some embodiments, the provider server 220 may generate the video preview through the use of keyframes (e.g., i-frames). For example, the provider server 220 can generate a video preview by transcoding the image data to the first keyframe. After the first keyframe, the provider server 220 can generate a lossless copy of the data starting at a particular start time and ending at a particular end time (e.g., based on a timestamp, based on a predetermined length of time, based on particular information displayed in the image data). In some processes, the method may ensure the final product is correctly encoded without sacrificing significant processing time by transcoding the entire video.

In some embodiments, the provider server 220 may allow the user device 230 to create a video preview from a streaming full video. For example, the video server 210 may provide a traditional television broadcast transmitted through an IP network. In this case, the streaming video is provided to the user device 230 from the video server 210. The user device 230 activates a request a first time to start buffering the streaming video at the provider server 220. The provider server 220 requests the streaming video from the video server 210 and receives the streaming video. In some embodiments, the provider server 220 can begin storing the video data (e.g., buffering).

When the provider server 220 receives a streaming full video, the timestamp may accompany the request to start buffering the streaming video. For example, when the user device 230 activates a request the request can identify a timestamp. The provider server 220 can request and receive the streaming video to start buffering the streaming video at the provider server 220.

In some embodiments, the provider server 220 can discard the portion of the full video or video preview (e.g., and the affiliated files, metadata, or information) after the video preview has been generated.

B. By a User Device

Various methods may be used to create a video preview at a user device. For example, a user device 230 can receive at least a portion of the full video (e.g., from a video server 210). The user can activate an activation tool on a GUI provided by the user device 230 to identify a timestamp. The timestamp can be obtained in response to a user viewing at least a portion of the full video at the computing device (e.g., user device 230) within a GUI and activating the request tool to identify the timestamp, where the timestamp specifies the video preview.

In some embodiments, the user device 230 can store a backup of the portion of the full video or store a backup of the video preview. The user device 230 may store the full video and/or video preview locally, with the provider server 220, on a distributed/cloud data store, or via a remotely accessible data store.

The user device 230 can create a video preview from a portion of the full video based on the timestamp. For example, the user device 230 may generate the video preview in a variety of ways, including using encoding, transcoding, re-encoding, or generating a lossless copy of the video. The duration of the video preview may be based on a predetermined length of time (e.g., specified by one or more activation tools in the GUI, identified by a predetermined length of time identified by the user or curator, or based on the most popular activation tool setting, including 15 seconds).

Figure 6:
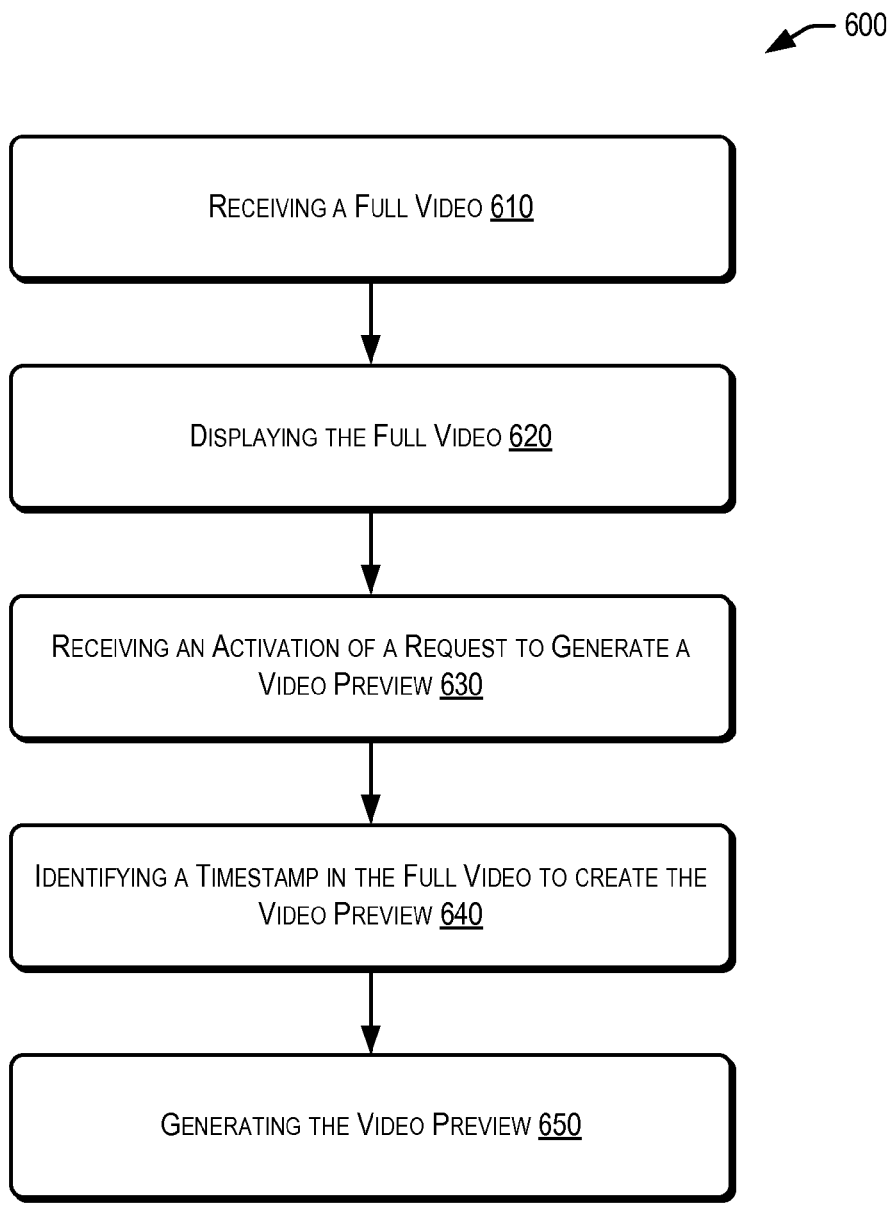
FIG. 6 shows a flowchart illustrating a method of generating a video preview by a user device according to an embodiment of the present invention.

Another method of creating a video preview is shown in FIG. 6. FIG. 6 shows a flowchart illustrating a method of generating a video preview by a user device according to an embodiment of the present invention. The method 600 may be implemented by a computing device (e.g., a user device 230).

At block 610, a full video may be received. For example, the user device 230 can generate a full preview locally (e.g., using a software application or "app"), where the user device receives the full video from the user device 230. In another example, the user device 230 may first access an "app store" or some provider of software applications. The user device 230 can receive an executable file, so that the user device 230 is enabled to receive full videos. After installation, the software application on the user device can communicate with the video server 210 to receive a full video at the user device 230.

The user device 230 may receive the full video from a video server 210 or other computing device. In another example, the user device 230 can generate the full video independent of the video server 210. The user device 230 can transmit a full video to the provider server 220 or a reference to the full video.

At block 620, the full video may be displayed. For example, the user device 230 can display the full video (e.g., stored locally, stored remotely, streamed from a video server 210, or in a GUI on a screen of the user device).

At block 630, an activation of a request to generate the video preview may be received. For example, the user device 230 may activate a request provided by the software application. In another example, the user device 230 can activate a request provided by a webpage, GUI, or other computing device. An identification of the activation can be received at the user device 230.

At block 640, a timestamp in the full video may be identified. For example, the activation can generate a timestamp, a start time, and/or predetermined length of time for the desired video preview. The length of the video preview may correspond with a predetermined length of time. In one embodiment, the request may automatically correlate with a predetermined amount of time (e.g., at the user device 230, in association with a category for the video). In some embodiments, the user device 230 can provide different buttons for different amounts of time (e.g., one button for a 15 second video preview, one button for a 5 second video preview, one button for a video preview of the last 10 seconds of the full video). In this manner, the length of time can be specified, but the user does not need to specify the duration of time via another action.

At block 650, the video preview may be generated based in part on the timestamp. In one example, the user device 230 generates the video preview independent of the video server 210. In another example, the provider server 220 can generate the video preview (e.g., via transcoding) and provide the video preview to the user device 230. In yet another example, the user device 230 can generate the video preview or upload the video preview to the video server 210. In still another example, the software application can use the full video (e.g., MP4 file, stream, full video portion) to generate the video preview (e.g., by transcoding the full video, by using a portion of the encoded full video) based on the identified timestamp.

In some embodiments, the video preview (e.g., file, animated GIF, link to a video preview) may be stored in a temporary location (e.g., clipboard, temporary data buffer) or at another location on a user device 230 (e.g., cache, removable storage device) determined by the software application. The user may copy/paste the video preview to an email client, SMS, or other application in order to use or share the video with other applications and/or devices.

In another example, the user device 230 can transmit the generated video preview to the provider server 220 or use the generated video preview locally at the user device. In some embodiments, the provider server 220 can store a backup of the video preview and/or help the user device distribute the generated video preview (e.g., via social networking, using a distributed database).

C. By a Video Server

Figure 7:
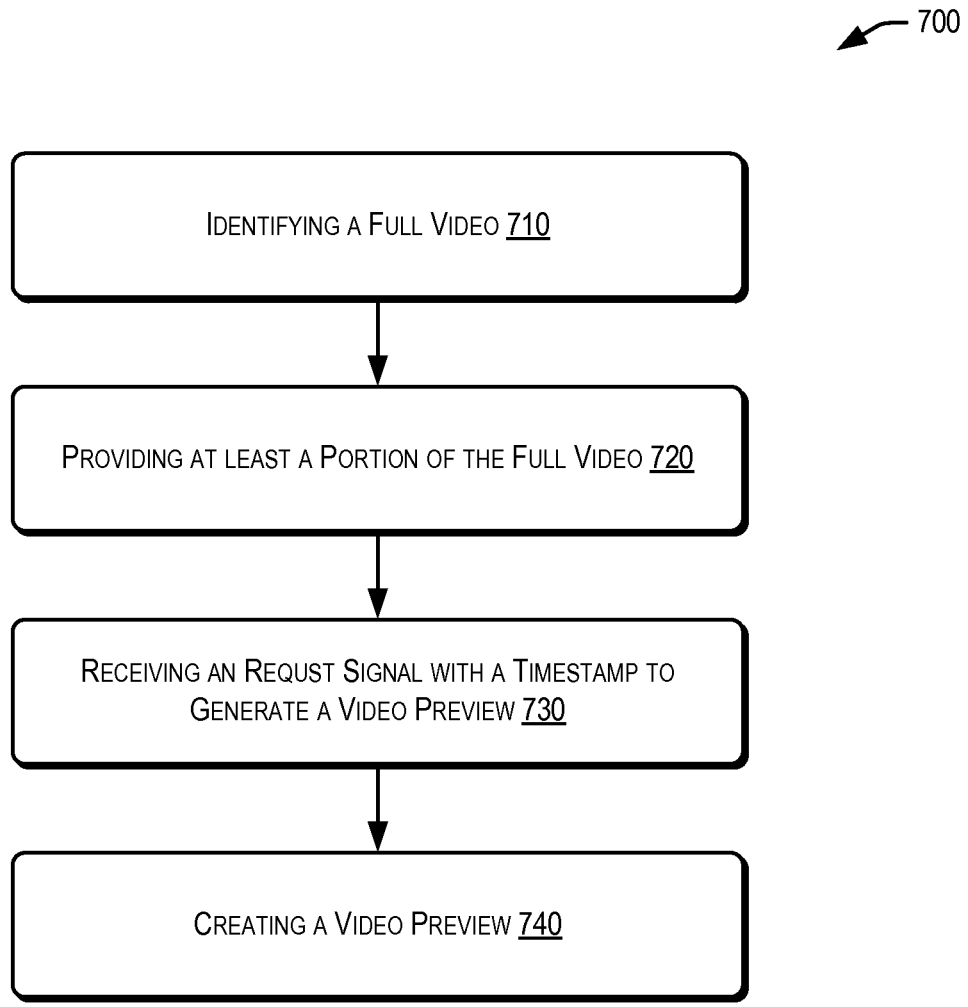
FIG. 7 shows a flowchart illustrating a method of generating a video preview by a video server according to an embodiment of the present invention.

FIG. 7 shows a flowchart illustrating a method of generating a video preview by a video server according to an embodiment of the present invention. The method 700 may be implemented by a computing device (e.g., a video server 210).

At block 710, a full video may be identified (e.g., at the video server 210 or at the provider server 220). For example, the provider server 220 can receive the full video (e.g., in response to a user request, in response to a push notification) from the video server 210. In another example, the full video may be identified by the video server 210.

At block 720, at least a portion of the full video may be provided (e.g., accessible from a data store associated with the video server 210, a portion of the full video from the user device 230, etc.). For example, the provider server 220 can receive the full video (e.g., in response to a user request or in response to a push notification). In another example, the full video may be located at the video server 210 and at least a portion of the full video may be provided locally.

At block 730, a request signal to generate a video preview may be received from a user device. The request signal can be generated by the user device in response to an activation of a request tool. The request signal can include a timestamp. For example, the video server 210 can receive the request to generate the video preview from a user device 230 or provider server 220 (e.g., using a timestamp or using a predetermined portion of the video preview).

At block 740, a video preview may be created. For example, the video server 210 can support transcoding functionality and create the video preview. In another example, the video server can transmit the images to a computing device (e.g., provider server 220) to create the video preview.

The video server 210 may provide the video preview in various formats. For example, the video server 210 can provide the video preview as an additional link stored with the video server (e.g., when the video preview is uploaded to the video server 210 from the provider server 220). In another example, the video preview can be transmitted as a link to the full video with instructions. The instructions can identify for a web browser, software application, or user device which portion of the full video to play and/or repeat for the video preview. In yet another example, the video preview may be provided as an attachment to a message, provided through a GUI accessible by the user device, or other methods. In another example, the video server 210 can store the generated video preview at the video server 210 and provide the video preview (or link to the video preview) to the user device 230 as a pre-encoded video preview from the provider server 220.

V. Adjusting the Duration of the Video Preview

Figure 8:
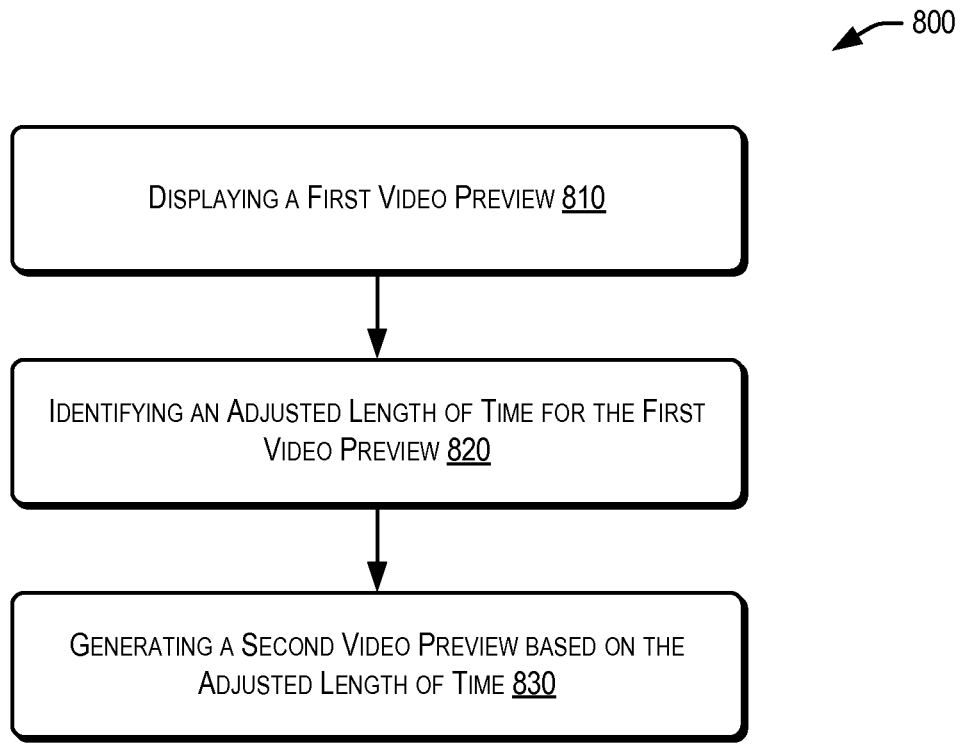
FIG. 8 shows a flowchart illustrating a method of adjusting the duration of a video preview according to an embodiment of the present invention.

FIG. 8 shows a flowchart illustrating a method of adjusting the duration of a video preview according to an embodiment of the present invention. The method 800 may be implemented by a computing device (e.g., a video server 210, a provider server 220, user device 230). In some embodiments, the video preview may be altered or the video preview may be used to generate a second video preview.

At block 810, a first video preview may be displayed. The process may begin when the user device 230 receives the video preview from a provider server 220, receives a video preview from a video server 210, or generates the video preview locally.

At block 820, an adjusted length of time for the first video may be identified. For example, the user device 230 can select a new start time, end time, duration, timestamp, or other specifications in order to alter the video preview. The user device 230 can transmit the timestamp or other specifications to the provider server 220. In some embodiments, an adjusted length of time for the first preview can be identified that is shorter than the predetermined length of time.

At block 830, a second video preview may be generated based on the adjusted length of time. For example, the provider server 220 can generate the altered video preview (e.g., via transcoding) and provide the altered video preview to the user device 230. In some embodiments, the user device 230 may alter the video preview locally.

Figure 9A:
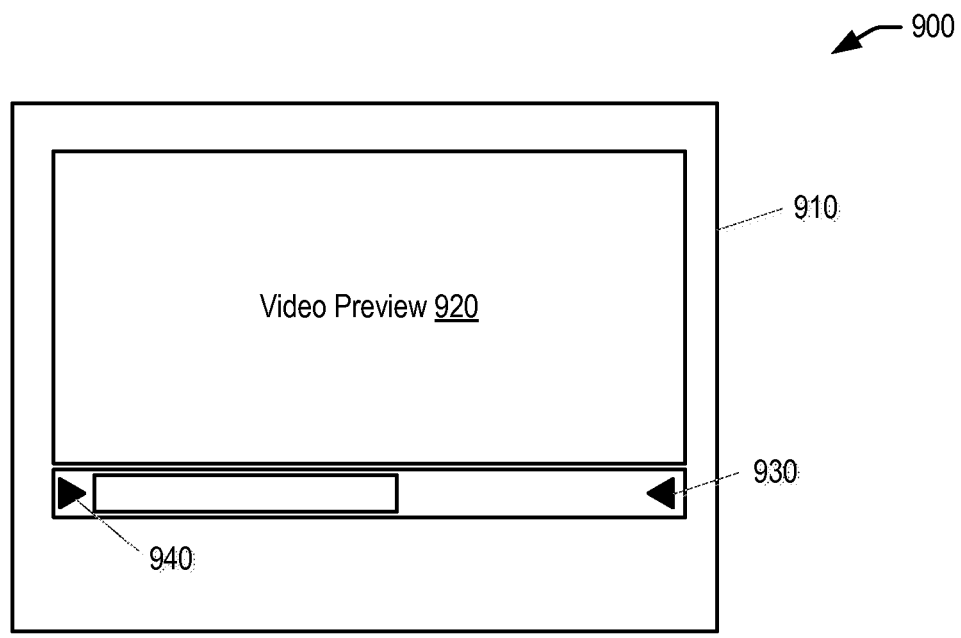
FIGS. 9A-9B show a graphical user interface used to generate a video preview.
Figure 9B:
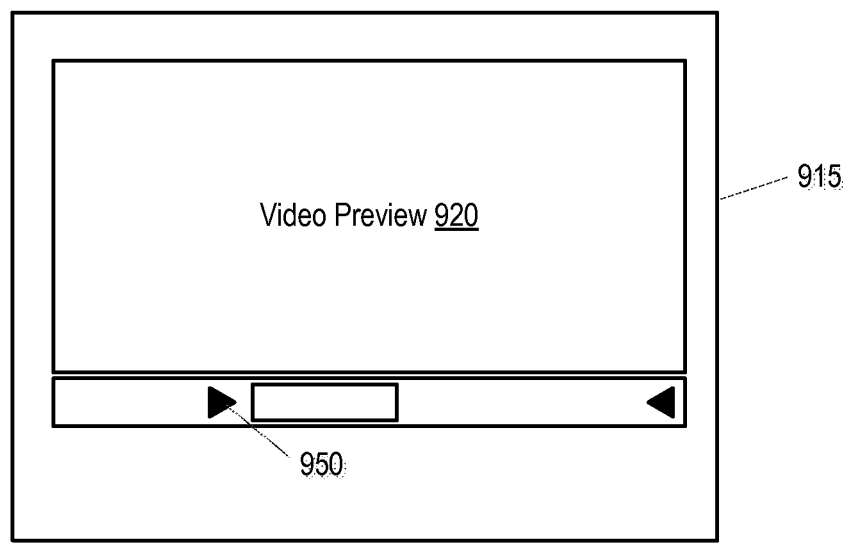

FIGS. 9A-9B show a graphical user interface used to generate a video preview. The GUI 900 may be used to adjust a length of time of the video preview according to an embodiment of the present invention. The GUI 900 can include a video preview 920 (e.g. in a frame object), an end time indicator 930, a start time indicator 940, and one or more adjusted time indicators 950. In some embodiments, the one or more adjusted time indicators 950 can be the end time indicator 930 or start time indicator 940, but moved (e.g., slid, dragged) to a different location.

The GUI 900 is shown at two points of time, including a first time 910 and a second time 915. At the first time 910, the GUI can display the video preview 920 once the video preview has been created. The GUI at the first time 910 may also display the original start time indicator 940 and end time indicator 930, showing the duration of the video preview as a predetermined length of time.

The GUI 900 may allow a user to adjust the length of time of the video preview, as shown at the second time 915. For example, the user was allowed to drag a movable icon to the right to shorten the duration of the video preview. In other examples, the user may provide input to identify an adjusted length of time of the video preview.

The duration of the video preview can be adjusted. For example, at the second time 915, the start time can be moved so that the adjusted start time is later in the video preview, but the end time remains static. In some embodiments, both the start and end time may be adjusted. In response, the system may generate a second video preview based on the adjusted length of time. In some embodiments, the video preview can be provided by the GUI with the adjusted duration.

VI. Providing a Video Preview

In some embodiments, the video preview may be provided to a computing device. For example, after the video preview has been generated, the video preview may be shared by embedding the video preview as an iFrame or other form of network-based instruction. In another example, the video preview may be shared (e.g., through a messaging service) by providing the link to the video preview to an iMessage, SMS, or e-mail. In still other examples, the video preview may be shared through other social networking platforms, including Facebook®, Twitter®, Google+®, or Tumblr®. In one embodiment, the choice of embedding or linking can be made with buttons.

In an embodiment, the video preview can be displayed in-line in a messaging service. For example, if the video preview is added to an e-mail message, the video preview can "play" in the e-mail once it is added to the e-mail, the user can select "send" to send the email, and the video preview can automatically "play" for the recipient of the e-mail without activating the video preview or accessing the full video through a website. In some examples, the video preview can be captured as an animated GIF (graphical interchange format) and/or can play automatically when the video preview appears as an image on a screen, irrespective of a trigger mechanism.

In an embodiment, an interface (e.g., a GUI) can be displayed once the video preview has been created. The video preview can be provided (e.g., displayed, transmitted, played, activated) via the interface.

In an embodiment, the video preview can be transmitted to the user device once the video preview has been created with a request to confirm that the video preview is acceptable. The user device may respond to the request (e.g., yes, no, I would like to adjust the duration of the video preview). When the response indicates that the video preview is acceptable, the video preview can be provided (e.g., transmitted) to the computing device (e.g., video server 210, provider server 220, user device 230, third party server 240).

VII. Example Subsystems and Components

Figure 10:
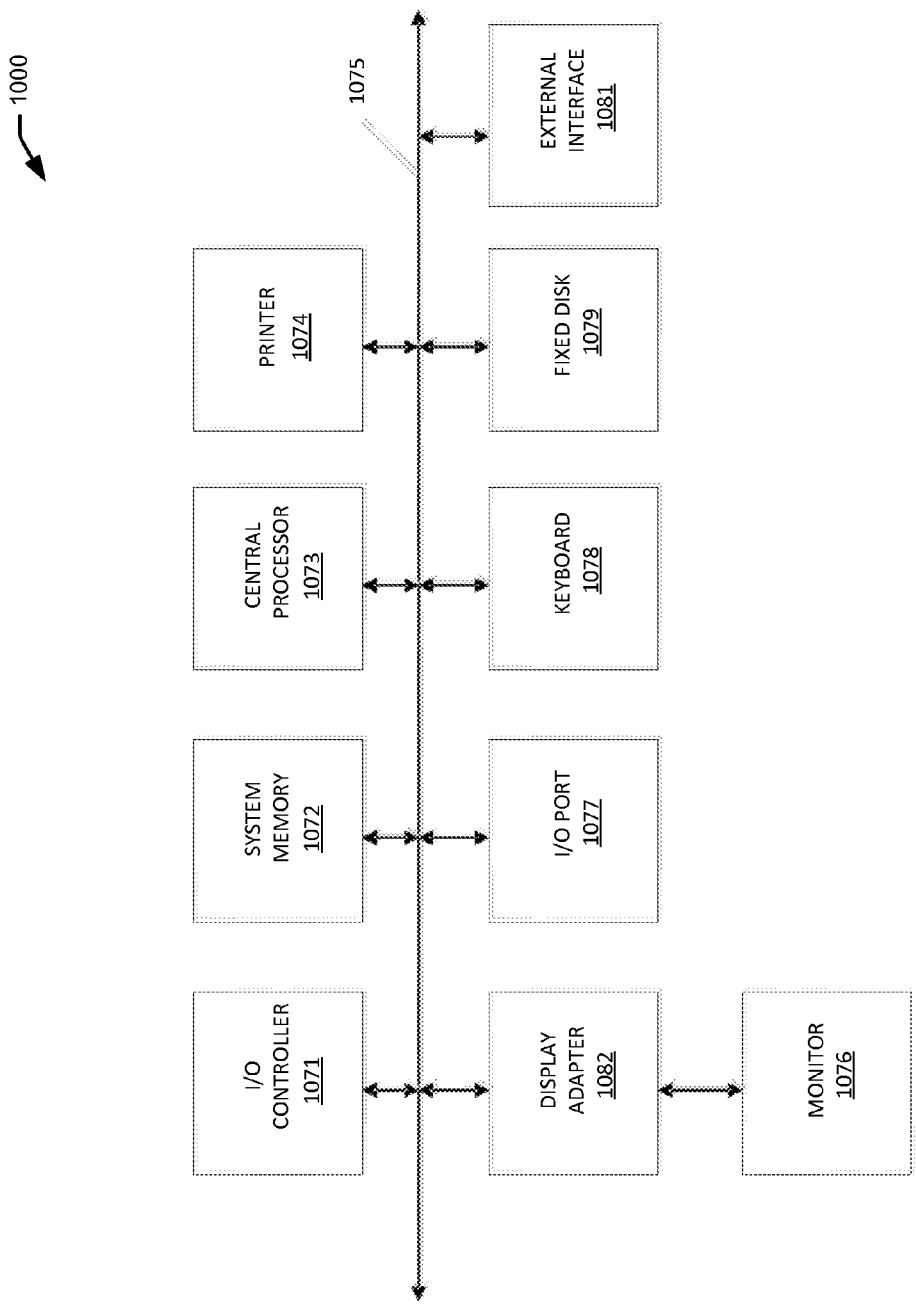
FIG. 10 shows a block diagram of a computer apparatus according to an embodiment of the present invention.

Any of the clients or servers may utilize any suitable number of subsystems. Examples of such subsystems or components are shown in FIG. 10. The subsystems shown in FIG. 10 are interconnected via a system bus 1075. Additional subsystems such as a printer 1074, keyboard 1078, fixed disk 1079, monitor 1076, which is coupled to display adapter 1082, and others are shown. Peripherals and input/output (I/O) devices, which couple to I/O controller 1071, can be connected to the computer system by any number of means known in the art, such as input/output (I/O) port 1077 (e.g., USB, FireWire®). For example, I/O port 1077 or external interface 1081 (e.g. Ethernet, Wi-Fi, etc.) can be used to connect the computer apparatus to a wide area network such as the Internet, a mouse input device, or a scanner. The interconnection via system bus allows the central processor 1073, which may include one or more processors, to communicate with each subsystem and to control the execution of instructions from system memory 1072 or the fixed disk 1079 (such as a hard drive or optical disk), as well as the exchange of information between subsystems. The system memory 1072 and/or the fixed disk 1079 may embody a computer readable medium. Any of the data mentioned herein can be output from one component to another component and can be output to the user.

It should be understood that any of the embodiments of the present invention can be implemented in the form of control logic using hardware (e.g. an application specific integrated circuit or field programmable gate array) and/or using computer software with a generally programmable processor in a modular or integrated manner. As user herein, a processor includes a multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java®, C++ or Perl using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer program product (e.g. a hard drive, a CD, or an entire computer system), and may be present on or within different computer program products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary.

What is claimed is:

1. A method of creating a video preview comprising:
   receiving a full video at a user device from a video server;
   displaying the full video in a graphical user interface (GUI) of the user device, the GUI including an activation object that is associated with a predetermined length of time;
   receiving, at the user device, an activation of the activation object while the full video is being displayed on the GUI of the user device, the activation initiated by a user selection of the activation object on the GUI of the user device, the user selection comprising a single user input; and
   identifying, by the user device, a timestamp in the full video corresponding to when the activation object was activated by the user device, the timestamp specifying the video preview, wherein the video preview is created from the full video based on the timestamp, and wherein a duration of the video preview is the predetermined length of time that is associated with the activation object.

2. The method of claim 1, wherein the activation is a single activation that identifies a start time and stop time in the full video.

3. The method of claim 2, wherein the timestamp corresponds to the stop time, and the predetermined length of time specifies the start time.

4. The method of claim 1, wherein the full video is a portion of a longer full video, and wherein the video preview is a shorter duration than the full video.

5. The method of claim 1, wherein the GUI includes a plurality of activation objects, the plurality of activation objects corresponding with different predetermined lengths of time.

6. The method of claim 1, further comprising:
   sending the timestamp to a provider server.

7. The method of claim 1, further comprising:
   sending the timestamp to the video server.

8. The method of claim 1, wherein the activation specifies the predetermined length of time.

9. The method of claim 1, wherein the predetermined length of time is 15 seconds.

10. The method of claim 1, wherein the timestamp in the full video is at the end of the video preview.

11. The method of claim 1, further comprising:
    displaying an interface once the video preview has been created; and
    providing the video preview via the interface.

12. The method of claim 11, wherein the video preview is a first video preview, wherein the interface allows a user to adjust a length of time of the first video preview, and the method further comprising:
    identifying an adjusted length of time for the first preview that is shorter than the predetermined length of time; and generating a second video preview based on the adjusted length of time for the first video preview.

13. The method of claim 1, further comprising:
creating, by the user device, the video preview from the full video based on the timestamp, the video preview being a predetermined length of time.

14. The method of claim 13, further comprising:
altering the video preview based on user input, wherein the video preview is altered by a new start time, end time, or duration.

15. The method of claim 1, wherein the activation is activated by selecting a button embedded with the GUI of the user device.

16. The method of claim 1, wherein the activation is activated by selecting a button embedded with a graphical user interface (GUI) of a third party.

17. The method of claim 1, wherein the full video is generated by the user device.

18. The method of claim 17 wherein the full video is stored in a temporary buffer at the user device.

19. The method of claim 1 wherein the full video is stored in a storage device associated with a television.

20. The method of claim 1 wherein the full video is stored in a storage device associated with a game console.

21. A computer product comprising a non-transitory computer readable medium storing a plurality of instructions that when executed control a computer system to generate the video preview to implement the method of claim 1.

22. The method of claim 1, wherein the full video is received as a streaming video.

23. The method of claim 1, wherein the video server determines a link to the full video before the full video is received at the user device from the video server, and wherein the link to the full video is received at the user device.

24. A method of creating a video preview comprising:
receiving, at a computing device, a timestamp of a location in a full video, the timestamp being obtained in response to a user viewing at least a portion of the full video at the computing device within a graphical user interface (GUI) that includes an activation object that is associated with a predetermined length of time, wherein the timestamp specifies the video preview and corresponds to when the user activates the activation object in the GUI using a single user input;
requesting at least a portion of the full video;
receiving the at least the portion of the full video; and
creating, by the computing device, the video preview from the portion of the full video based on the timestamp, wherein a duration of the video preview is the predetermined length of time that is associated with the activation object.

25. The method of claim 24, wherein the timestamp of the location in the full video is centered in the video preview.

26. The method of claim 24, wherein the timestamp of the location in the full video is at the end of the video preview.

27. The method of claim 24, further comprising:
transmitting the video preview to a user device once the video preview has been created;
sending, to the user device, a request to confirm that the video preview is acceptable;
receiving a response from the user device; and
when the response indicates that the video preview is acceptable, providing the video preview to the user device.

28. The method of claim 27, wherein the transmitted video preview is a first video preview, wherein the response indicates a shorter length for the first video preview, and the method further comprising:
generating a second video preview having the shorter length.

29. The method of claim 24, wherein the video preview is shared by embedding the video preview within a message transmitted through a messaging service.

30. The method of claim 24, wherein the timestamp is a first timestamp, and further comprising:
receiving a second timestamp for the video preview, the video preview beginning at a first timestamp and the video preview ending at the second timestamp.

31. The method of claim 24, wherein the timestamp is a plurality of timestamps, and further comprising:
receiving the plurality of timestamps, the plurality of timestamps corresponding to a plurality of portions of the full video;
retrieving the plurality of portions of the full video; and
generating the video preview by concatenating the plurality of portions of the full video.

32. The method of claim 24, wherein a video server supports transcoding functionality.

33. The method of claim 24, wherein the full video is a streaming video, and receiving at least a portion of the full video is received as a streaming transmission.

34. The method of claim 24, wherein the full video is an animated graphics interchange format (GIF) file.

35. The method of claim 24, wherein the video preview is received at the user device from a video server.

36. The method of claim 24, wherein the video preview is received at the user device from a provider server.

37. The method of claim 24, wherein the video preview is created at the user device.

38. The method of claim 24, wherein creating the video preview includes transcoding at least a portion of the full video into a different format than the full video.

39. A computer product comprising a non-transitory computer readable medium storing a plurality of instructions that when executed control a computer system to create the video preview to implement the method of claim 24.

40. A method of creating a video preview comprising:
identifying a full video at a video server;
providing, by the video server, at least a portion of the full video to a user device within a graphical user interface (GUI), the GUI including an activation object that is associated with a predetermined length of time;
receiving, at the video server from the user device, an identification of a timestamp of a location in the full video that a user identifies to generate the video preview, wherein the timestamp specifies the video preview and corresponds to when the user activates the activation object in the GUI using a single user input; and
creating the video preview from the portion of the full video based on the timestamp, wherein the duration of the video preview is the predetermined length of time that is associated with the activation object.

41. A computer product comprising a non-transitory computer readable medium storing a plurality of instructions that when executed control a computer system to create the video preview to implement the method of claim 40.

* * * * *